C. R. ALLEN.
FASTENING DEVICE FOR VEHICLE TOPS.
APPLICATION FILED OCT. 23, 1920.

1,438,353.

Patented Dec. 12, 1922.

INVENTOR
Charles R. Allen.
BY Jay, Oberlin & Jay
ATTORNEYS.

Patented Dec. 12, 1922.

1,438,353

UNITED STATES PATENT OFFICE.

CHARLES R. ALLEN, OF ASHTABULA, OHIO, ASSIGNOR TO THE ASHTABULA BOW SOCKET COMPANY, OF ASHTABULA, OHIO, A CORPORATION OF OHIO.

FASTENING DEVICE FOR VEHICLE TOPS.

Application filed October 23, 1920. Serial No. 419,066.

*To all whom it may concern:*

Be it known that I, CHARLES R. ALLEN, a citizen of the United States, and a resident of Ashtabula, county of Ashtabula, and State of Ohio, have invented a new and useful Improvement in Fastening Devices for Vehicle Tops, of which the following is a specification, the principle of the invention being herein explained and the best mode in which I have contemplated applying that principle, so as to distinguish it from other inventions.

In the modern development of the so-called Cape top, as adopted for use on automobiles and like vehicles, known as "one-man" top, as well as, for that matter, in the older form of such Cape top in which separately supported bows carry the top covering, it has become the practice to attach the forward more or less horizontally extending bow to the windshield frame or special standard rising from the vehicle body. This mode of attachment is obviously preferable to the long straps and the like which were formerly used to tie down the front ends of these tops, and devices in considerable variety have been proposed for thus directly attaching the front portion of the top to the windshield frame, varying from short straps to more elaborate clamps. Most, if not all, of these are inconvenient in operation and, furthermore, are liable to rattle, if not when the top is extended and attached in the fashion described, then, when the top is collapsed and laid back.

The object, accordingly, of the present invention is to provide a device of this sort that will be simple in construction and operation, and will, at the same time, serve to securely attach the top to the vehicle body through the medium of such windshield frame or like structure. A further object is to provide a device that can be adjusted readily, so as not to rattle either when the top is collapsed, or when it is in its open position and thus attached.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various forms in which the principle of the invention may be used.

In said annexed drawing:—

Figure 1:
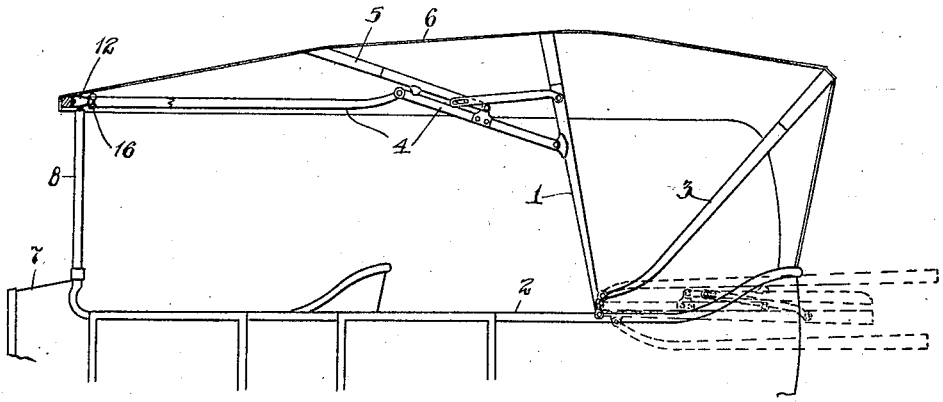
Figure 2:
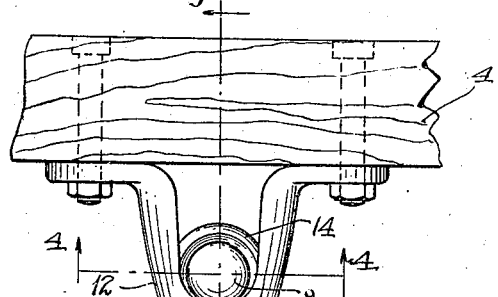
Figure 6:
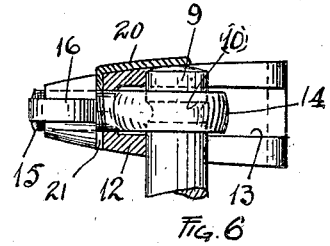
Figure 3:
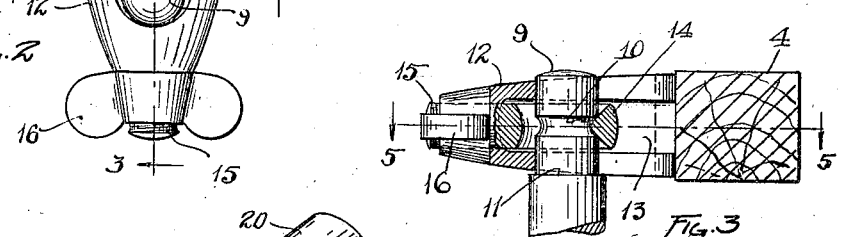
Figure 7:
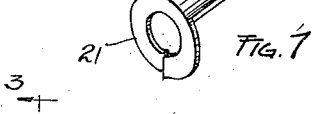
Figure 5:
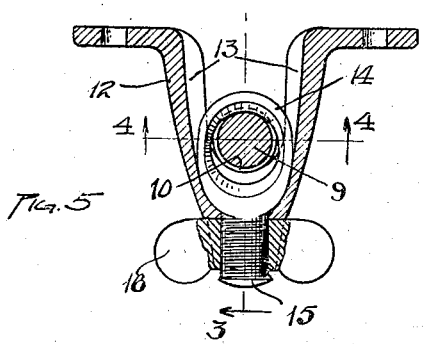
Figure 4:
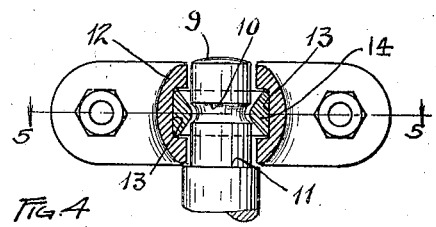

Fig. 1 is a broken side elevation of the forward portion of a foldable top, of the kind hereinbefore referred to, shown in its extended position and with my improved device in place thereon, whereby such top is attached to the vehicle body; Fig. 2 is a plan view on a somewhat larger scale of such device; Figs. 3 and 4 are vertical sections of the same, as indicated by the lines 3—3 and 4—4, Fig. 2; Fig. 5 is a horizontal section thereof, the plane of such section being indicated by the line 5—5, Fig. 3, and Figs. 6 and 7 illustrate a modification.

The construction of the top, of course, is a matter of indifference so far as the operation of my improved securing device is concerned. The one illustrated is a commercial form of so-called "one-man" top characterized by having a forwardly inclined main bow 1 that is pivotally attached to the vehicle body 2 adjacent the rear seat thereof, where such body is two-seated. A rearwardly inclined main bow 3 is pivotally attached to such first-named main bow near the point where it is thus attached to the vehicle body, and a jointed outrigger bow 4, likewise pivotally attached to said first-named bow, extends forwardly in a more or less horizontal direction over the front seat of the body, in the open condition of the top illustrated in Fig. 1. An intermediate bow 5, carried by said outrigger bow, serves to support the top material 6 intermediate between the forward portion, or outrigger bow proper and the main bow 1.

Rising from the dash or cowl 7 are two posts or standards 8, which may, as in the construction illustrated, form the side members of the windshield frame, or be independent supports, as the case may be, the upper ends of these standards being so disposed as to lie just within the transverse portion of the outrigger bow 4 in such open condition of the top. Such upper ends of these standards are in the form of cylindrical studs 9, as best shown in Fig. 3, having an encircling groove 10 spaced from the extremity of the stud, while a short distance below the groove there is a shoulder or collar 11.

Attached to the inside of the bow, so as to register with each such stud, is a V-shaped bracket 12 formed on its inwardly directed sides with grooves 13 (see Fig. 4), which serve to non-rotatably hold and guide the head of an eye-bolt 14, the threaded stem 15 of which projects through an opening in the end of the bracket, a wing-nut 16 on the projecting portion of such stem being adapted to draw such head towards the end of the bracket.

In its inner or loose position, the head of bolt 14 is adapted to freely pass over or engage with the corresponding cylindrical stud 9, the rounded extremity of the latter facilitating such engagement, and the collar or shoulder 11 thereon serving to limit the position of the bracket, so as to prevent the bow from dropping too far. In this position of the parts, the eye-bolt, when tightened, is brought into engagement with the encircling groove 10 on the stud and presses the latter against the front of the bracket, thus obviously securely clamping the parts together.

It will be observed (see Fig. 3) that the inner face of that portion of eye-bolt 14 designed to engage with groove 10 is beveled both from above and below. As a result, not only is it assured that said eye-bolt when drawn forwardly will fit tightly between the edges of the groove, but the action of the upper of such beveled faces will be to pull the bracket 12 downwardly into firmly seated position on shoulder 11.

A very slight amount of movement on the part of the eye-bolt is sufficient to either clamp or unclamp the device, a single turn of the wing-nut 16 with standard thread being sufficient for this purpose. The ease with which the device may be operated is thus apparent. At the same time, when the clamping device proper is disengaged from the stud, a slight additional turn of the wing-nut serves to draw the bolt tightly against the end of the bracket, and thus to prevent rattling of the same, when the top is collapsed or folded.

In case a shoulder 11 cannot be conveniently provided on the stud, the alternative stop means illustrated in Figs. 6 and 7 may be employed. As shown in such Fig. 6, which corresponds otherwise with Fig. 3, a plate 20 is provided to cover the top of the bracket and so prevent the stud from projecting therethrough. This plate can be either separate, as thus shown, or formed integral with the bracket, the separate construction being preferred, since a lock washer 21 rectangularly related thereto (see Fig. 7) may be incorporated, so as to slip over the stem 15 of the eye-bolt and prevent the accidental loosening of the nut 16.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a vehicle body and a foldable top therefor; of means for detachably securing the front portion of said top to said body, said means including a vertically projecting stud on said body formed with a recess and a transversely adjustable eye-bolt on said top adapted to engage with the recess in said stud and thereby clamp said top to the latter, one of the inter-engaging faces of said eye-bolt and the recess on said stud being beveled, substantially as and for the purpose described.

2. The combination with a vehicle body and a foldable top therefor; of means for detachably securing the front portion of said top to said body, said means including a vertically projecting stud on said body formed with an encircling recess and a shoulder below such recess, and a transversely adjustable eye-bolt in said top adapted to engage with the recess in said stud and thereby clamp said top to the latter, the shoulder on said stud serving as a stop to determine the position of said eye-bolt thereon, one of the inter-engaging faces of said eye-bolt and the recess on said stud being beveled, substantially as and for the purpose described.

3. The combination with a vehicle body and a foldable top therefor; of means for detachably securing the front portion of said top to said body, said means including a vertically projecting stud on said body formed with a recess, a V shaped bracket on said top adapted to fit over said stud and having grooves in its inwardly directed walls, and an eye-bolt adjustably held in such grooves and adapted to engage the recess on said stud and clamp the same against said bracket upon being drawn forwardly, the face of said eye-bolt thus adapted to engage such recess being beveled both from above and below.

4. The combination with a vehicle body and a foldable top therefor; of means for detachably securing the front portion of said top to said body, said means including a vertically projecting stud on said body formed with a recess, a V-shaped bracket on said top adapted to fit over said stud and having grooves in its inwardly directed walls, and an eye-bolt adjustably held in such grooves and adapted to engage the recess on said stud and clamp the same against said bracket, said stud being formed with a shoulder serving as a stop to determine the position of said bracket and thus of said eye-bolt thereon, and the face of the latter thus adapted to engage such recess being beveled both from above and below.

5. A device of the character described, including a stud, a V-shaped bracket adapted to fit over a stud and having grooves in its inwardly directed walls, and an eye-bolt adjustably held in such grooves and adapted to engage said stud and clamp the same against said bracket, the face of said eye-bolt thus adapted to engage said stud being beveled, substantially as and for the purpose described.

Signed by me, this 20th day of October, 1920.

CHARLES R. ALLEN.